(12) United States Patent
York

(10) Patent No.: US 7,687,952 B2
(45) Date of Patent: Mar. 30, 2010

(54) BRUSHLESS ALTERNATOR WITH STATIONARY SHAFT

(75) Inventor: Michael T. York, Pendleton, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 424 days.

(21) Appl. No.: 11/394,258

(22) Filed: Mar. 30, 2006

(65) Prior Publication Data

US 2007/0228867 A1 Oct. 4, 2007

(51) Int. Cl.
*H02K 19/00* (2006.01)

(52) U.S. Cl. .................. 310/91; 310/261.1; 310/263

(58) Field of Classification Search .......... 310/263, 310/89, 58, 59, 91, 261.1
See application file for complete search history.

(56) References Cited

U.S. PATENT DOCUMENTS

| | | | | |
|---|---|---|---|---|
| 3,749,954 A | * | 7/1973 | Anderson, Jr. | 310/90 |
| 4,418,295 A | * | 11/1983 | Shiga | 310/59 |
| 4,701,653 A | * | 10/1987 | Merkle et al. | 310/152 |
| 4,980,587 A | * | 12/1990 | Yonei et al. | 310/67 R |
| 5,705,865 A | * | 1/1998 | Ishida et al. | 310/62 |
| 5,775,878 A | * | 7/1998 | Maumus et al. | 416/186 R |
| 5,796,190 A | * | 8/1998 | Takeda et al. | 310/58 |
| 6,166,461 A | * | 12/2000 | Kusase et al. | 310/58 |
| 6,710,477 B2 | * | 3/2004 | Lau | 310/43 |
| 6,882,077 B2 | * | 4/2005 | Neet | 310/208 |
| 2007/0096589 A1 | * | 5/2007 | York | 310/263 |

FOREIGN PATENT DOCUMENTS

| | | |
|---|---|---|
| FR | 91198 | 4/1968 |
| FR | 2088656 | 1/1972 |
| FR | 2609583 | 7/1988 |

OTHER PUBLICATIONS

International Search Report, Application No. PCT/US2007/006274, Date Mailed Sep. 14, 2007.

* cited by examiner

*Primary Examiner*—Tran N Nguyen
(74) *Attorney, Agent, or Firm*—Cantor Colburn LLP

(57) ABSTRACT

Disclosed herein is a rotor assembly for an electric machine including a stationary shaft, a first bearing, a second bearing, a first pole segment, a second pole segment, a first internal fan, and a second internal. The first bearing is positioned at a first end of the shaft. The second bearing is positioned at a second end of the shaft. The first pole segment is supported by the first bearing and is rotatable about the shaft. The second pole segment is supported by the second bearing and is rotatable about the shaft. The first internal fan is attached to the first pole segment. And, the second internal fan is attached to the second pole segment.

21 Claims, 3 Drawing Sheets

US 7,687,952 B2

BRUSHLESS ALTERNATOR WITH STATIONARY SHAFT

TECHNICAL FIELD

This application relates generally to an electrical apparatus. More specifically, this application relates to an electric machine having improved power density, cooling, and bearing life.

BACKGROUND OF THE INVENTION

Brushless electric machines are found in many motor vehicles powered today. These electric machines, also referred to as alternators, produce electricity necessary to power vehicle accessories, as well as to charge a vehicle's battery. Electric machines must also provide the capability to produce electricity in sufficient quantities to power a vehicle's electrical system in a manner that is compatible with the vehicle electrical components. Furthermore, electrical loads for vehicles continue to escalate while, at the same time, the overall package size available for the electrical machine continues to shrink.

Conventional brushless electric machine components lack a sufficient magnetic circuit to achieve higher power densities and require expensive drive end bearings due to their support system. In addition, they do not have internal cooling needed to supply electricity at these higher demands and therefore have larger package sizes. Accordingly, there is a need for a higher power density system having a more robust support structure that does not require expensive bearings and an improved magnetic circuit with internal cooling capabilities to enable higher power densities in a reduced package size.

BRIEF SUMMARY OF THE INVENTION

Disclosed herein is a rotor assembly for an electric machine including a stationary shaft, a first bearing, a second bearing, a first pole segment, a second pole segment, a first internal fan, and a second internal fan. The first bearing is positioned at a first end of the shaft. The second bearing is positioned at a second end of the shaft. The first pole segment is supported by the first bearing and is rotatable about the shaft. The second pole segment is supported by the second bearing and is rotatable about the shaft. The first internal fan is attached to the first pole segment. And, the second internal fan is attached to the second pole segment.

Further disclosed herein is a rotor assembly for an alternator including a stationary shaft, a field coil, a first pole segment, a second pole segment, a first internal fan, a second internal fan, and a pulley. The field coil surrounds the shaft. The first and second pole segments are rotatably attached to the shaft. The first internal fan is attached to the first pole segment. The second internal fan is attached to the second pole segment. And, the pulley is attached to the first pole segment.

Yet further disclosed herein is an electric machine including a shaft, a first pole segment, a second pole segment, a first internal fan, a second internal fan, a stator, and a housing. The first pole segment is attached to the shaft. The second pole segment is attached to the shaft and rotates with the first pole segment. The first internal fan is attached to the first pole segment. The second internal fan is attached to the second pole segment. The stator surrounds the first pole segment and the second pole segment. And the housing has a first half and a second half, which surrounds the stator. The second half of the housing is attached to the first half of the housing and a body portion of the first half is cantilevered from a support member portion of the first half.

BRIEF DESCRIPTION OF THE DRAWINGS

Referring to the drawings wherein like elements are numbered alike in the several Figures.

DETAILED DESCRIPTION OF THE INVENTION

Figure 1:
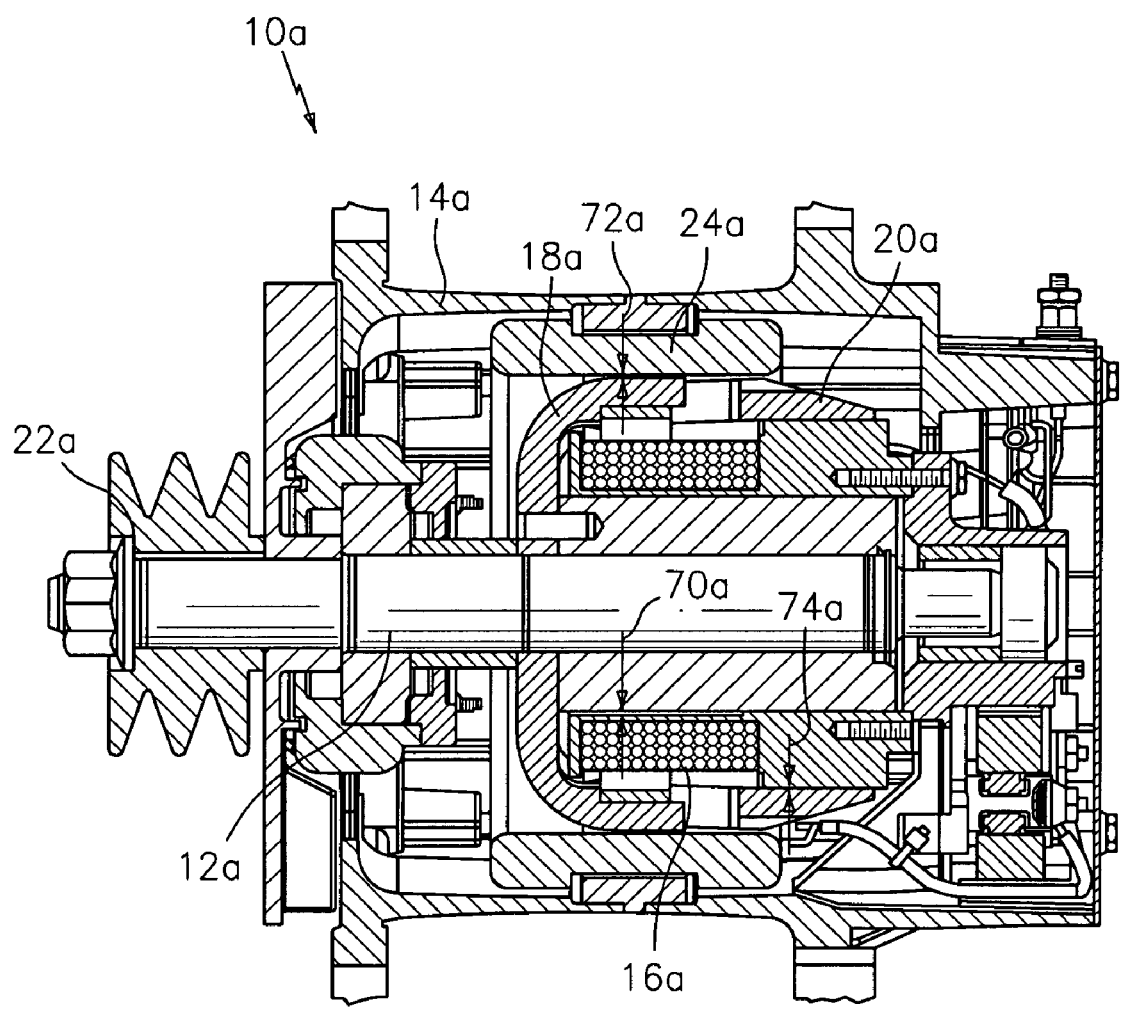
FIG. 1 is a cross section view of a conventional brushless electric machine.

FIG. 1 illustrates a cross-section view of a conventional brushless electric machine 10a. The conventional brushless electric machine 10a includes a rotatable shaft 12a supported within a housing 14a, a field coil 16a wound over a spool 17 attached to the housing 14a, a first pole segment 18a rotatable with the shaft 12a, and a second pole segment 20a (also rotatable with the shaft 12a) cantilevered from the first pole segment 18a. Additionally, a pulley 22a is attached to a portion of the shaft projecting through the housing 14a, and a stator 24a, attached to the housing 14a, surrounds the pole segments 18a and 20a.

Figure 2:
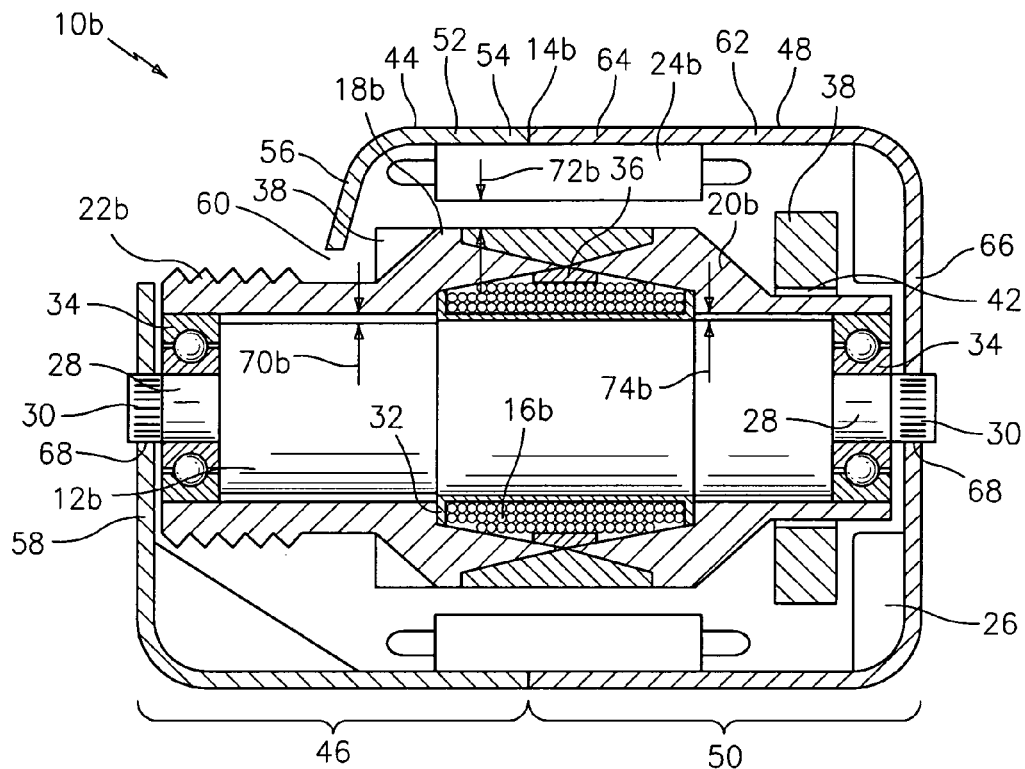
FIG. 2 is a cross section view of an exemplary brushless electric machine for use in accordance with an embodiment of the invention.
Figure 3:
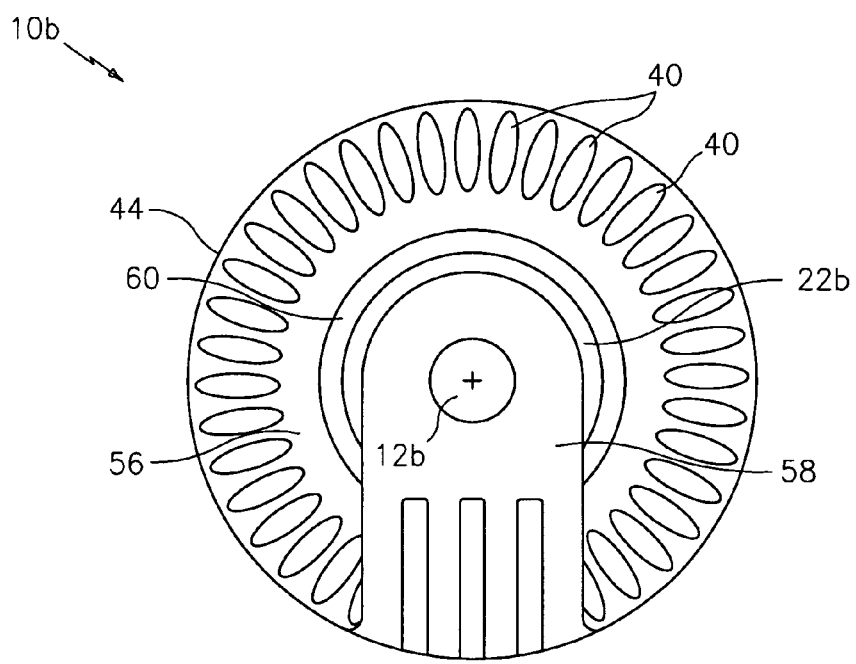
FIG. 3 is a front plan view of the brushless electric machine illustrated in FIG. 2.

Referring to FIGS. 2 and 3, an exemplary embodiment of a brushless electric machine 10b that, for example, in one embodiment can be used in an automobile alternator, is illustrated. The brushless electric machine 10b includes a stationary shaft 12b mounted inside a housing 14b, a field coil 16b fixed to the shaft 12b, a first pole segment 18b and a second pole segment 20b surrounding the field coil 16b and rotatable about the stationary shaft 12b, a pulley 22b transmitting rotational torque to the pole segments 18b and 20b, a stator 24b attached to the housing 14b and surrounding the pole segments 18b and 20b, and a rectifier 26 converting alternating current generated in the stator into direct current. The stationary shaft configuration of the electric machine 10b provides many significant advantages over conventional configurations having rotating shafts including improved durability, power density, and higher speed capability.

The stationary shaft 12b has a common diameter substantially throughout the axial length of the shaft 12b and includes reduced diameter portions 28 at each end of the shaft 12b. Although FIG. 2 shows the shaft 12b having a common diameter, it should be noted that the diameter may vary at different axial points along the axial length of the shaft. The reduced diameter portions 28, in one embodiment (and as illustrated) further include knurled ends 30, which are received by the housing 14b in a press-fit configuration. It is to be understood however that the knurls are not required. One alternative configuration does not exhibit knurls at all but merely will have an outside diameter sufficient to cause an interference engagement with the housing 14b. A second alternative configuration has a press-fit engagement to the housing 14b on one end of the shaft 12b and a slip fit engagement to the housing 14b on the other end of the shaft 12b. Shaft 12b may also be fastened to the housing 14b, for example by welding, so that tight tolerances for an interference fit may be relaxed. The shaft 12b is a stationary component, not intended to rotate with the pulley 22b, and provides a mounting surface to which a bobbin spool 32 attaches. The field coil 16b is wound upon the bobbin spool 32 and generates, when energized, a magnetic flux that saturates the pole segments 18b and 20b and the shaft 12b. Attaching the bobbin spool 32 and field coil 16b to the shaft 12b, which is press-fitted at one or both ends to the housing 14b and thus providing for a robust support structure, improves the vibration capability of the electric machine 10b over conventional configurations having a cantilevered bobbin spool and field coil.

Figure 4:
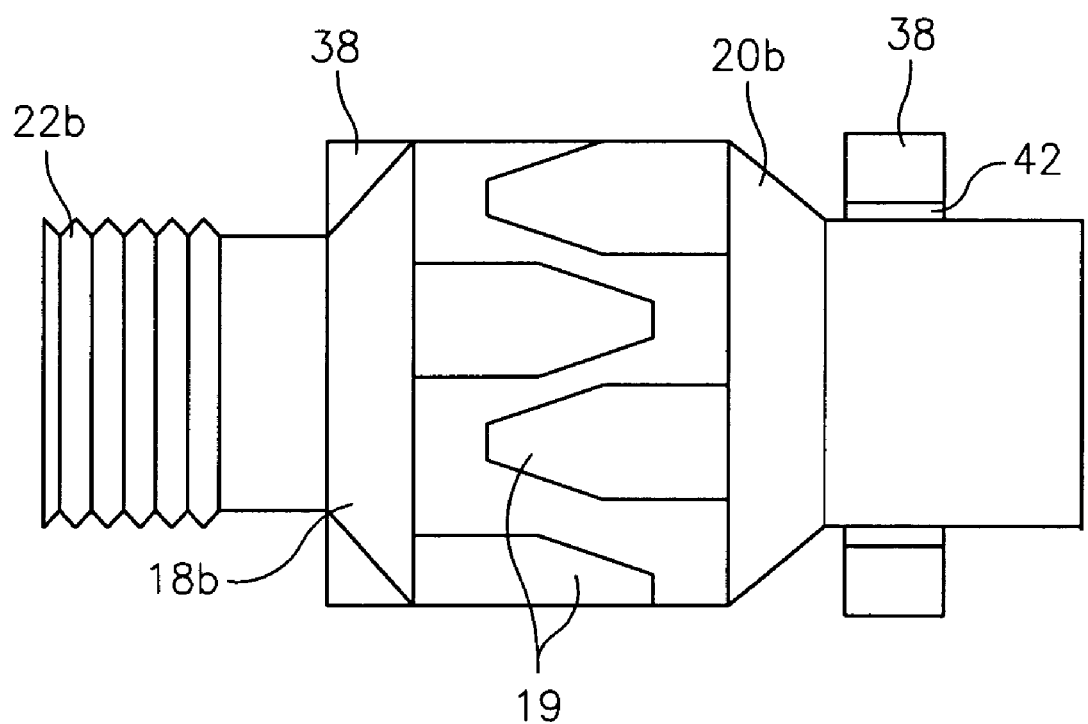
FIG. 4 is a front plan view of a rotor only portion of the brushless electric machine illustrated in FIG. 2.

The shaft 12b also supports a pair of bearings 34 attached at the reduced diameter portions 28 of the shaft 12b adjacent to the knurled ends 30. The bearings 34 in turn rotatably support the pole segments 18b and 20b thereby allowing the pole segments 18b and 20b to rotate about the shaft 12b. The first pole segment 18b and the second pole segment 20b are attached to each other by way of a ring 36 that may be welded or press-fitted between the two pole segments 18b and 20b. The pole segments 18b and 20b may be, for example, in one embodiment, claw pole segments each having a plurality of claw-shaped fingers 19 extending from the outer periphery of each of the pole segments as illustrated in FIG. 4. The ring 35 is fabricated from a non-ferromagnetic material to prevent leakage flux between the pole segments 18b and 20b. Attachment of the pole segments 18b and 20b allows for rotation of the second pole segment 20b when a rotational torque is applied to the first pole segment 18b. Rotational torque, from an engine for example, is transmitted to first pole segment 18b by means of a belt (not shown) wrapped around the outer periphery of the pulley 22b which may be attached to, by a press fit for example, or integral with (as shown in FIGS. 2 and 4), the first pole segment 18b. The bearing 34 supporting the first pole segment 18b is disposed within an inside diameter of the pulley 22b, thus resulting in longer life and reduced wear of the bearing 34 as compared to conventional designs having uneven or cantilevered loads applied the bearing.

A pair of fans 38 are attached to the pole segments 18b and 20b to circulate cooling air within the electric machine 10b. The fans 38 draw air into the electric machine 10b from an axial direction through a plurality of cooling slots 40 (illustrated in FIG. 3) within the housing 14b and exhaust air out in a radial direction inside the housing 14b. The fans 38 may be integral with or attached to the pole segments 18b and 20b. One method of attaching the fan 38 to the pole segment 18b and/or 20b may include an insert ring 42 disposed between the fan 38 and the pole segment 18b or 20b to provide for a press-fit therebetween.

The housing 14b comprises a first half 44 surrounding a pulley end 46 of the electric machine 10b and a second half 48 surrounding a rectifier end 50 of the machine 10b. The first half 44 of the housing 14b has a body portion 52 having a cylindrical shape, wherein the body portion 52 has an open end 54 and a partially closed end 56, cantilevered from a tongue shaped support member portion 58. An opening 60 in the partially closed end 56 has a diameter capable of allowing the pulley 22b to project through the partially closed end 56 for proper orientation with respect to the belt. The cylindrical body portion 52 is offset from the support member portion 58 in the axial direction to allow for engagement of the belt with the pulley 22b. The second half 48 of the housing 14b also has a body portion 62 having a cylindrical shape which includes an open end 64 and a closed end 66. The first half 44 and second half 48 of the housing 14b are attached together at their respective open ends 44 and 64 to form the housing 14b. Additionally, the support member portion 58 and the closed end 66 each have a small opening 68, along the cylindrical body portion 52 and 62 central axis, having a close tolerance diametral dimension for receiving the knurled portion of the shaft 12b in a press-fit configuration.

During operation of the electric machine 10b, magnetic flux first flows from the field coil 16b to the shaft 12b. Next, the magnetic flux flows from the shaft 12b to the adjacent first pole segment 18b through an air gap 70b defined therebetween. Then, the magnetic flux flows from the first pole segment 18b to the stator through an air gap 72b defined therebetween. Further, the magnetic flux flows from the stator to the second pole segment 20b through the air gap 72b. Yet further, the magnetic flux flows from the second pole segment 20b to the shaft 12b through an air gap 74b defined therebetween.

Significant advantages in power densities may be attained by reducing the magnetic reluctance of the air gaps 70b, 72b, and 74b in a magnetic circuit. Reluctance is governed by the equation R=L/uA, where R is reluctance, L is the air gap length, u is a constant, and A is the face area of the air gap. Referring to FIG. 2, the air gaps in the above formula are illustrated as numerals 70b, 72b, and 74b. Wherein air gap 70b is the radial distance between the shaft 12b and the first pole segment 18b, air gap 72b is the radial distance between the pole segments 18b and 20b and the stator 24b, and air gap 74b is the radial distance between the second pole segment 20b and the shaft 12b. The air gap length (L) in the reluctance formula (R=L/uA) will be understood to be the radial distances between the corresponding components discussed above. While the face area (A) of the air gap is defined by the component surfaces adjacent to the air gap (i.e. the outer surface of the shaft 12b and the inner surface of the pole segments 18b and 20b for air gaps 70b and 74b, and the outer surfaces of the pole segments 18b and 20b and inner surface of the stator 24b for air gap 72b). The geometry of the electric machine 10b, having a pair of pole segments 18b and 20b rotatable about the long stationary shaft 12b, provides for large face areas (A) of the air gaps 70b and 72b between the shaft 12b and pole segments 18b and 20b that provide many times higher face area of the air gap over conventional machine configurations having a first pole segment attached to a rotating shaft and a second pole segment cantilevered from the first pole segment, thus resulting in relatively small face areas (A) of the air gaps (illustrated as air gaps 70a, 72a, and 74a in FIG. 1). Due to the robust support structure of the stationary shaft 12b and pole segments 18b and 20b within the electric machine 10b, smaller nominal clearances between rotating and stationary components are achievable, thus allowing for reduced air gap lengths. The air gap length 70b and 72b can be greatly reduced since each pole segment 18b or 20b is supported by a bearing 34 on one end and the opposing pole segment 18b or 20b via the ring 36 on the other end, thus eliminating the cantilevered pole configuration of conventional machines. Further, the second pole segment 20b is better supported, as described above, than conventional brushless pole segments thus allowing for reduced length of the air gap 72b. The stability in the rotor improves the high speed capability of the electric machine 10b by reducing the deflection of the pole segments 18b and 20b caused by centrifugal force during rotation of the electric machine 10b. The reduction in magnetic reluctance leads to improved power output in a smaller package size, and therefore reducing the overall weight of the electric machine 10b. In addition, the internal cooling fans 38 contained within the housing 14b further enable a small overall package size of the electric machine 10b.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A rotor assembly for an electric machine comprising:
   a stationary shaft having a first end portion that extends to a second end portion through an intermediate portion, the intermediate portion having a substantially constant diameter;
   a stationary coil disposed at the intermediate portion of the stationary shaft, the stationary coil being radially proud of magnetically active portions of the shaft;
   a first bearing positioned at a first end of the shaft;
   a second bearing positioned at a second end of the shaft, the intermediate portion extending from the first bearing to the second bearing;
   a first pole segment, supported by the first bearing, rotatable about the shaft;
   a second pole segment, supported by the second bearing, rotatable about the shaft;
   a first internal fan attached to the first pole segment; and
   a second internal fan attached to the second pole segment.

2. The rotor assembly of claim 1 wherein the second internal fan further comprises a ring disposed between the second internal fan and the second pole segment resulting in a press fit therebetween.

3. The rotor assembly of claim 1 further comprising a pulley integral with the first pole segment.

4. The rotor assembly of claim 1 further comprising a pulley press-fitted onto the first pole segment.

5. The rotor assembly of claim 1 wherein the first bearing is disposed within an inside diameter of the first pole segment.

6. The rotor assembly of claim 1 further comprising a ring press-fitted or welded between the first pole segment and the second pole segment.

7. The rotor assembly of claim 1 further comprising a bobbin spool positioned at the stationary shaft.

8. The rotor assembly of claim 7 wherein the stationary coil surrounds the bobbin spool.

9. The rotor assembly of claim 1 wherein the rotor assembly is disposed within a vehicle alternator.

10. The rotor assembly of claim 1 wherein the first pole segment and the second pole segment each further comprise a plurality of claw-shaped fingers extending from the outer periphery of each of the pole segments.

11. A rotor assembly for an alternator comprising:
    a stationary shaft having a first end portion that extends to a second end portion through an intermediate portion, the intermediate portion having a substantially constant diameter;
    a field coil surrounding the intermediate portion of the stationary shaft, the stationary coil being radially proud of magnetically active portions of the shaft;
    a first pole segment rotatably attached to the shaft, the first pole segment extending across in a spaced relationship the intermediate portion so as to define a first stator air gap having a first length;
    a second pole segment rotatably attached to the shaft, the second pole segment extending across in a spaced relationship the intermediate portion so as to define a second stator air gap having a second length;
    a first internal fan attached to the first pole segment;
    a second internal fan attached to the second pole segment; and
    a pulley attached to the first pole segment.

12. The rotor assembly of claim 11 wherein the pulley is press-fitted onto the first pole segment.

13. The rotor assembly of claim 11 wherein the first pole segment and the second pole segment each further comprise a plurality of claw-shaped fingers extending from the outer periphery of each of the pole segments.

14. An electric machine comprising:
    a stationary shaft having a first end portion that extends to a second end portion through an intermediate portion, the intermediate portion having a substantially constant diameter;
    a stationary coil disposed at the intermediate portion of the stationary shaft, the stationary coil being radially proud of magnetically active portions of the shaft;
    a first pole segment attached to the shaft, the first pole segment extending across in a spaced relationship the intermediate portion of the stationary shaft so as to define a first stator air gap having a first length;
    a second pole segment attached to the shaft and rotatable with the first pole segment, the second pole segment extending across in a spaced relationship the intermediate portion of the stationary shaft so as to define a second stator air gap having a second length;
    a first internal fan attached to the first pole segment;
    a second internal fan attached to the second pole segment;
    a stator surrounding the first pole segment and the second pole segment; and
    a housing having a first half and a second half surrounding the stator, wherein the second half of the housing is attached to the first half of the housing and a body portion of the first half is cantilevered from a support member portion of the first half.

15. The electric machine of claim 14 wherein the electric machine is a brushless electric machine.

16. The electric machine of claim 14 wherein the shaft is press-fitted to at least one half of the housing.

17. The electric machine of claim 14 wherein the housing further comprises a plurality of cooling slots.

18. The electric machine of claim 14 wherein the stationary coil surrounds the shaft.

19. The electric machine of claim 14 further comprising a pulley integral with the first pole segment.

20. The electric machine of claim 14 wherein the electric machine is a vehicle alternator.

21. The electric machine of claim 14 wherein the first pole segment and the second pole segment each further comprise a plurality of claw-shaped fingers extending from the outer periphery of each of the pole segments.

* * * * *